US009357433B2

(12) United States Patent
Tarradell et al.

(10) Patent No.: US 9,357,433 B2
(45) Date of Patent: *May 31, 2016

(54) REDUCING INTERFERENCE IN COLLOCATED RADIOS

(75) Inventors: Marta M. Tarradell, Hillsboro, OR (US); Sherry Chen, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/976,601

(22) PCT Filed: Sep. 30, 2011

(86) PCT No.: PCT/US2011/054462
§ 371 (c)(1),
(2), (4) Date: Jul. 14, 2014

(87) PCT Pub. No.: WO2013/048515
PCT Pub. Date: Apr. 4, 2013

(65) Prior Publication Data
US 2015/0296412 A1    Oct. 15, 2015

(51) Int. Cl.
*H04L 27/26*    (2006.01)
*H04W 72/04*    (2009.01)
*H04W 28/04*    (2009.01)
*H04W 72/12*    (2009.01)
(Continued)

(52) U.S. Cl.
CPC ......... *H04W 28/044* (2013.01); *H04L 27/2601* (2013.01); *H04W 4/008* (2013.01); *H04W 72/0446* (2013.01); *H04W 72/1215* (2013.01); *H04W 88/06* (2013.01)

(58) Field of Classification Search
CPC .................................................. H04W 72/1215
USPC ................................................... 370/328, 338
See application file for complete search history.

(56) References Cited

U.S. PATENT DOCUMENTS 7,929,432 B2 *   4/2011   Zhu ................... H04W 72/1215
                                                        370/229
7,941,178 B2 *   5/2011   Guo ................... H04W 72/1215
                                                        370/335

(Continued)

FOREIGN PATENT DOCUMENTS

WO          2013/048515 A1     4/2013

OTHER PUBLICATIONS

Chiasserini et al, "Coexistence Mechanisms for Interference Mitigation in the 2.4ghz ism Band", IEEE Transactions on Wireless Communications, Sep. 2003, pp. 964-975, vol. 2, No. 5, IEEE Service Center, Piscataway, NJ.

(Continued)

*Primary Examiner* — Rasheed Gidado
(74) *Attorney, Agent, or Firm* — Thorpe North & Western LLP

(57) ABSTRACT

Technology for reducing interference in collocated radios is disclosed. One method comprises logging transmit/receive information from a Bluetooth radio and an OFDMA radio for a repeating Tx/Rx pattern. Data collisions between the radios are identified. A persistent reservation is requested in the OFDMA radio for collisions in the repeating Tx/Rx pattern. A repeating Bluetooth Tx/Rx pattern is derived from the logged data and the collision data. Bluetooth radio communication is accomplished using the Bluetooth Tx/Rx pattern.

29 Claims, 12 Drawing Sheets

(51) Int. Cl.
*H04W 4/00* (2009.01)
*H04W 88/06* (2009.01)

(56) References Cited

U.S. PATENT DOCUMENTS

| | | | | |
|---|---|---|---|---|
| 7,945,206 B2* | 5/2011 | Wilhelmsson | H04W 72/1215 | 370/328 |
| 8,095,176 B2* | 1/2012 | Sudak | H04B 1/406 | 455/41.2 |
| 8,553,592 B2* | 10/2013 | Yang | H04B 1/525 | 370/281 |
| 8,787,468 B2* | 7/2014 | Truong | H04W 72/1215 | 375/132 |
| 8,830,934 B2* | 9/2014 | Banister | H04B 1/0475 | 370/329 |
| 8,897,220 B2* | 11/2014 | Kadous | H04W 72/1215 | 370/328 |
| 2005/0170776 A1 | 8/2005 | Siorpaes | | |
| 2008/0240021 A1 | 10/2008 | Guo et al. | | |
| 2008/0247445 A1 | 10/2008 | Guo et al. | | |
| 2009/0054009 A1 | 2/2009 | Yang et al. | | |
| 2010/0195584 A1 | 8/2010 | Wilhelmsson et al. | | |
| 2011/0235621 A1* | 9/2011 | Ko | H04W 72/1215 | 370/338 |
| 2012/0188907 A1* | 7/2012 | Dayal | H04W 72/1215 | 370/254 |
| 2013/0016635 A1* | 1/2013 | Linsky | H04W 72/1215 | 370/280 |

OTHER PUBLICATIONS

European Search Report received for PCT application No. 11873253.6 mailed on May 27, 2015, 8 pages.
International Search Report and Written Opinion received for PCT application No. PCT/US2011/054462, mailed on Feb. 28, 2012, 11 pages.
Lansford, et al. "Wi-Fi (802.11b) and Bluetooth: Enabling Coexistence" IEEE Network, vol. 15, Issue 5, Sep./Oct. 2001, pp. 20-27.

* cited by examiner

| BT interval $[T_{eSCO}]$ | Number of $T_{eSCO}$ for periodicity [n] | Duration (ms) based on BT periodicity $[T_{eSCO}*n*t_{BTslot}]$ | Number of LTE frames for periodicity [m] | Duration (ms) based on LTE periodicity $[m*t_{4Gframe}]$ |
|---|---|---|---|---|
| 6 | 8 | 30 | 3 | 30 |
| 8 | 2 | 10 | 1 | 10 |
| 10 | 8 | 50 | 5 | 50 |
| 12 | 4 | 30 | 3 | 30 |
| 14 | 8 | 70 | 7 | 70 |
| 16 | 1 | 10 | 1 | 10 |
| 18 | 8 | 90 | 9 | 90 |

FIG. 3a

| BT interval $[T_{eSCO}]$ | Number of $T_{eSCO}$ for periodicity [n] | All # $T_{eSCO}$ periodicity is multiple of T with T=8 [n * x = T] |
|---|---|---|
| 6 | 8 | 8 * 1 = 8 |
| 8 | 2 | 2 * 4 = 8 |
| 10 | 8 | 8 * 1 = 8 |
| 12 | 4 | 4 * 2 = 8 |
| 14 | 8 | 8 * 1 = 8 |
| 16 | 1 | 1 * 8 = 8 |
| 18 | 8 | 8 * 1 = 8 |

FIG. 3b

| LTE UL-DL configuration | Tesco = 6 | Tesco = 8 | Tesco = 10 | Tesco = 12 | Tesco = 14 | Tesco = 16 | Tesco = 18 |
|---|---|---|---|---|---|---|---|
| 0 | 024x024x | 00000000 | 0x420x42 | 04040404 | 024x024x | 00000000 | 0x420x42 |
| 1 | 024x024x | 00000000 | 0x420x42 | 04040404 | 024x024x | 00000000 | 0x420x42 |
| 2 | 024x024x | 00000000 | 0x420x42 | 04040404 | 024x024x | 00000000 | 0x420x42 |
| 3 | 0x4xx2xx | 0x0x0x0x | 0xx2xx4x | 04xx04xx | 024xxxxx | 00000000 | 0xxxxx42 |
| 4 | 0x4xx2xx | 0x0x0x0x | 0xx2xx4x | 04xx04xx | 024xxxxx | 00000000 | 0xxxxx42 |
| 5 | 0x4xx2xx | 0x0x0x0x | 0xx2xx4x | 04xx04xx | 024xxxxx | 00000000 | 0xxxxx42 |
| 6 | 0x4xx2xx | 0x0x0x0x | 0xx2xx4x | 04xx04xx | 024xxxxx | 00000000 | 0xxxxx42 |

FIG. 4a

| LTE UL-DL configuration | Tesco = 6 | Tesco = 8 | Tesco = 10 | Tesco = 12 | Tesco = 14 | Tesco = 16 | Tesco = 18 |
|---|---|---|---|---|---|---|---|
| 0 | 02400240 | 00000000 | 00420042 | 04040404 | 02400240 | 00000000 | 00420042 |
| 1 | 02400240 | 00000000 | 00420042 | 04040404 | 02400240 | 00000000 | 00420042 |
| 2 | 02000200 | 00000000 | 00020002 | 00000000 | 02000200 | 00000000 | 00020002 |
| 3 | 00400200 | 00000000 | 00020040 | 04000400 | 02400000 | 00000000 | 00000042 |
| 4 | 00400200 | 00000000 | 00020040 | 04000400 | 02400000 | 00000000 | 00000042 |
| 5 | 00000200 | 00000000 | 00020000 | 00000000 | 02000000 | 00000000 | 00000002 |
| 6 | 044022x0 | 02020202 | 00x22044 | 042x042x | 024024x0 | 00000000 | 0xxxxx42 |

FIG. 4b

| BT Log Structure | | Packet Behavior | Packet Start Time | Packet Status |
|---|---|---|---|---|
| BT Packets over T (T=8) | 1st $T_{esco}$ | $A_1$ | $t_1$ | 1 |
| | 2nd $T_{esco}$ | $A_2$ | $t_2$ | -1 |
| | 3rd $T_{esco}$ | $A_3$ | $t_3$ | 1 |
| | 4th $T_{esco}$ | $A_4$ | $t_4$ | 1 |
| | 5th $T_{esco}$ | $A_5$ | $t_5$ | 1 |
| | 6th $T_{esco}$ | $A_6$ | $t_6$ | 1 |
| | 7th $T_{esco}$ | $A_7$ | $t_7$ | 1 |
| | 8th $T_{esco}$ | $A_8$ | $t_8$ | 1 |

FIG. 9a

| LTE Log Structure | | Time Data Allocation | | Data Direction | Data Status |
|---|---|---|---|---|---|
| | | Start Time | Stop Time | | |
| LTE Data Blocks over T (T=8) | $Block_1$ | $t_A$ | $t_B$ | Tx | 1 |
| | $Block_2$ | $t_C$ | $t_D$ | Tx | 1 |
| | $Block_3$ | $t_E$ | $t_F$ | Rx | -1 |
| | $Block_4$ | $t_G$ | $t_H$ | | |
| | ... | ... | ... | ... | ... |
| | $Block_n$ | $t_x$ | $t_y$ | Tx | 1 |

FIG. 9b

REDUCING INTERFERENCE IN COLLOCATED RADIOS

BACKGROUND

Modern wireless devices such as cell phones, tablets, laptops, notebooks, netbooks and other portable computing devices often include multiple types of radios for communication purposes. For instance, a smart phone may include a 4G radio to connect to a cell tower, a WiFi radio to connect to a local internet hot spot, and a Bluetooth radio to connect to a nearby device such as a headset or keyboard. The 4G radio can operate in the 2.3 Gigahertz (GHz) and 2.5 GHz range at substantially higher power than the WiFi and Bluetooth radios, which typically operate in the 2.4 GHz range. This can result in communication with the 4G radio causing substantial interference in the lower power WiFi and Bluetooth radios, thereby reducing the effectiveness of communication of each of the collocated radios.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3a provides a table showing a periodicity of the $T_{eSCO}$ intervals for Bluetooth relative to 3GPP LTE TDD frames in accordance with an example;

FIG. 3b provides a table showing that the periodicity of each $T_{eSCO}$ interval can be represented as a multiple of eight in accordance with an example;

FIG. 4a is a table showing a transmit/receive (Tx/Rx) pattern for the Bluetooth radio of FIG. 2 for the 3GPP LTE TDD configurations when three different interference avoidance mechanisms are applied in accordance with an example;

FIG. 4b is a table showing a (Tx/Rx) pattern for the Bluetooth radio of FIG. 2 for the 3GPP LTE TDD configurations when two different interference avoidance mechanisms are applied in accordance with an example;

FIGS. 9a and 9b are tables showing a log structure for logged data in accordance with an example;

Figure 1:
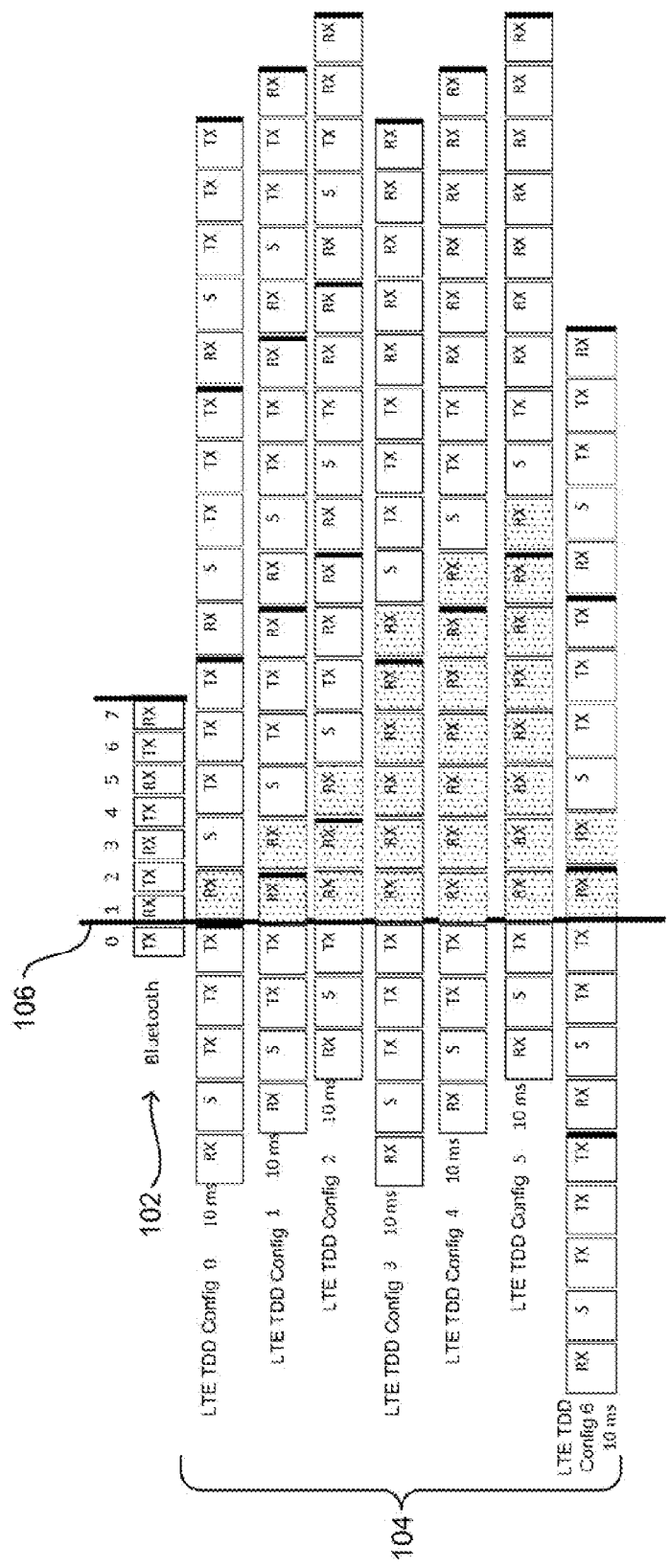
FIG. 1 illustrates a timing diagram of a Bluetooth radio packets synchronized with subframes in several time division duplex (TDD) configurations of a Third Generation Partnership Project (3GPP) Long Term Evolution (LTE) radio in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The simultaneous operation of a Bluetooth radio that is collocated in a wireless device with a radio configured to communicate using Orthogonal Frequency Division Multiple Access (OFDMA) can create interference that reduces the data throughput of both types of radios. The radio configured to communicate using OFDMA is referred to herein as an OFDMA radio. The OFDMA radio may be a Third Generation Partnership Project (3GPP) Long Term Evolution (LTE) radio or a Worldwide Interoperability for Microwave Access (WiMAX) radio, or a WiFi radio. Examples are provided herein using the 3GPP LTE radio. However, they are not intended to be limiting.

Bluetooth radio reception can collide with transmissions from the 3GPP LTE radio or WiMAX radio especially when both radios are collocated on the same device, such as a smart phone, a tablet, a net book, a laptop, or another type of wireless mobile device. Bluetooth transmissions can also desensitize radio reception in the 3GPP LTE radio or WiMAX radio.

A prediction algorithm for Bluetooth packets can be used to delay or cease transmission by a Bluetooth radio based on a process that characterizes each Bluetooth packet's behavior and operation. The delay or skip of activating a transmit/ receive slot in a Bluetooth packet transmission can assist in avoiding interference between the Bluetooth radio and a 3GPP LTE radio.

FIG. 1 provides a timing diagram showing the transmission and reception of eSCO formatted packets 102 for a Bluetooth radio and the Tx/Rx subframes 104 for selected 3GPP LTE frame configurations of a 3GPP LTE radio operating in a Time Domain Duplex (TDD) mode. The figures and tables presented herein are displayed using one-slot Bluetooth eSCO packets as an example. However, other packet types may be used as well, for example three or five slot packets. The Bluetooth eSCO packets can include a variety of different formats having a different number of transmit and receive time slots. For single slot eSCO packets, Bluetooth specifies intervals of 6, 8, 10, 12, 14, 16 and 18. The interval illustrated in FIG. 1 is $T_{eSCO}=8$, comprising four possible transmit time slots and four possible receive time slots. Bluetooth also specifies a possible re-transmit window $W_{eSCO}$ to be 0, 2, or 4. The re-transmit window specifies the number of attempts at transmitting that can occur within a Bluetooth packet to get a success transmit and receive packet. While the specification currently limits the retransmission attempts to 0, 2 or 4 instances, it is possible to include additional retransmission attempts when $T_{eSCO}$ is greater than 6. Future Bluetooth standards may include additional retransmission attempts, and the embodiments disclosed herein are not limited to the 0, 2 or 4 instances recited in the present standard.

The 3GPP LTE standard, as used herein, can include Releases 8, 9 and 10. However, the embodiments disclosed herein are not limited to these releases. Future standards can also apply when the same TDD configurations and subframe timing is used. A radio operating in accordance with at least one of these 3GPP LTE Releases is also referred to herein as an LTE radio. The use of the term 3GPP, 3GPP LTE, or LTE is not intended to be limiting. Any of the terms may refer to any of the releases, including the LTE advanced (LTE-A) release (Release 10).

Currently, seven different LTE TDD configurations are defined for 3GPP LTE communication. FIG. 1 provides an example of each LTE configuration, numbered 0-6. Each configuration is aligned at the beginning 106 of the longer continuous receive group of subframes for each LTE frame configuration type. The Bluetooth packet is synchronized such that a first receive time slot (Slot 1) is aligned with the first receive subframe of the continuous receive group of subframes in each of the seven LTE frame configurations.

As illustrated in FIG. 1, the Bluetooth time slots 102 have a different time period from the LTE subframe. Each Bluetooth time slot has a period of 0.625 milliseconds (ms), while each LTE frame has frame duration of 10 ms. Each LTE frame consists of 10 subframes. Thus, each subframe has duration of 1 ms. Accordingly, even though the Bluetooth packet is synchronized such that transmit Slot 0 is aligned with a transmit subframe in each LTE TDD configuration, and receive Slot 1 is aligned with the first receive subframe in the longer continuous group of receive subframes for each LTE frame configuration, the transmit and receive slots quickly become unaligned such that transmissions and receptions form the Bluetooth and 3GPP radios will create co-interference in each of the radios. Co-interference occurs when one of the radios transmits during the other radio's receive interval. This is especially true when the 3GPP LTE radio transmits during the receive period of the Bluetooth radio, since the 3GPP LTE radio transmits at significantly higher power and can therefore overpower most Bluetooth signals that the Bluetooth radio is attempting to receive during the receive period.

Figure 2:
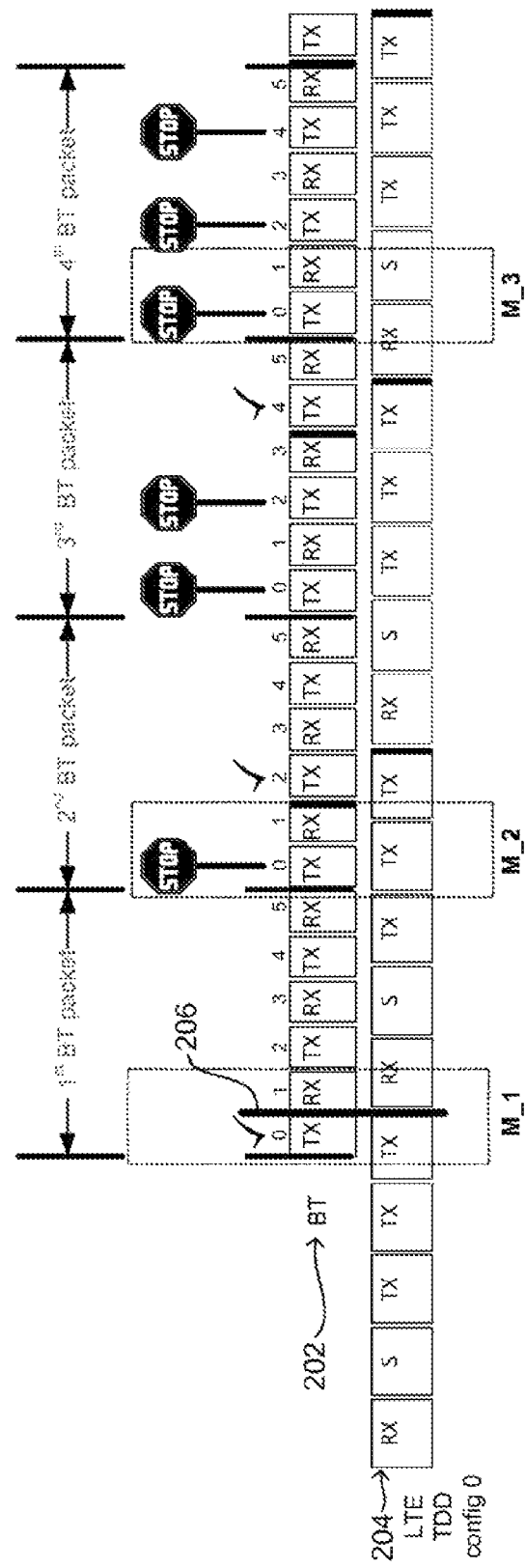
FIG. 2 illustrates a timing diagram of packets from the Bluetooth radio aligned with subframes from the 3GPP LTE (TDD) configuration 0 to illustrate which Bluetooth packets can be transmitted and received without interference from the 3GPP LTE subframes in accordance with an example.

FIG. 2 provides a timing diagram that shows Bluetooth time slots 202 for $T_{eSCO}=6$ relative to subframes 204 in 3GPP LTE TD frame configuration 0. In each Bluetooth packet, there are three opportunities to transmit when the re-transmission window, $W_{eSCO}$, is set to 4. As discussed herein, interference is considered to be avoided when the collocated radios transmit at the same time and receive at the same time.

There are three different mechanisms that can be used and combined to avoid interference between the LTE and Bluetooth radios:
1) M_1: LTE and Bluetooth frame synchronization;
2) M_2: Protect Bluetooth Rx from LTE Tx (delay or cease Bluetooth Tx); and
3) M_3: Protect LTE Rx from Bluetooth Tx (Bluetooth delays or ceases transmission during an LTE Rx subframe).

The first mechanism, M_1, involves frame synchronization of the Bluetooth time slots 202 with the LTE subframes 204. As shown in FIG. 2, the first receive time slot (Slot 1) in the first Bluetooth packet is synchronized to be aligned 206 with the first receive subframe in the continuous receive section of the LTE TDD frame configuration 0. In FIG. 2 successful transmission is denoted by a check mark above a Tx time slot. Using interference avoidance mechanism M_1, interference between the LTE and Bluetooth radios is avoided in the first Bluetooth packet, as illustrated in FIG. 2.

In the second Bluetooth packet interval illustrated in FIG. 2, the first transmit slot (Slot 0) aligns with an LE transmit subframe. However, the first receive slot (Slot 1) overlaps an LTE transmit slot, thereby creating a potential for interference at the Bluetooth radio when the LTE radio transmits. A "stop" sign is used to illustrate that this Tx/Rx Bluetooth opportunity cannot be used without causing interference. Using M_2, the Bluetooth Tx can be delayed to the next ix slot (Slot 2). In this instance Tx Slot 2 and Rx Slot 3 align with an LTE Tx subframe and an LTE Rx subframe, respectively.

Similarly, in the third Bluetooth packet, the first and second Bluetooth Tx and Rx slots do not align with an LTE Tx and Rx subframe. It isn't until Bluetooth Tx Slot 4 and Rx Slot 5 that alignment with an LTE Tx and Rx subframe is achieved.

In the fourth Bluetooth packet, there are no instances when a consecutive Bluetooth Tx and Rx slot aligns with an LTE Tx and Rx subframe. In this case, M_3 can be used, wherein Bluetooth can delay or cease transmission during the LTE receive subframe. However, this will result in no data being transmitted from the Bluetooth radio in the $4^{th}$ Bluetooth packet interval.

If the illustration of FIG. 2 were continued to show Bluetooth packets 5 through 8, it would be shown that the same pattern would occur in which the transmit time slot for the packets would be time slots 0, 2, 4, and no transmission, which can be represented as the variable "x". Thus, a repeating transmit pattern of (0, 2, 4, x) occurs between LTE TDD configuration 0 and Bluetooth $T_{eSCO}=6$, with a repetition occurring every four Bluetooth packets. This pattern is referred to as a Tx/Rx pattern since it represents the time slot in each Bluetooth packet at which the Bluetooth radio can transmit and receive.

More broadly, it can be shown that a repetitive Tx/Rx pattern occurs between each of the seven LTE TDD configurations and the seven Bluetooth $T_{eSCO}$ durations. The repetitive Tx/Rx pattern may repeat every 1, 2, 4, or 8 packets, depending on which LTE TDD configuration and Bluetooth packet duration is used.

A table in FIG. 3a represents the periodicity (i.e. the length of the repeating Tx/Rx pattern) for each of the seven different Bluetooth intervals. The left column (BT interval) shows the seven Bluetooth intervals $T_{eSCO}$. For each interval, the number of Bluetooth intervals (n) at which the pattern repeats is provided in the second column (also referred to in the table as Bluetooth periodicity). The time duration in milliseconds (ms) of the BT periodicity or repeating pattern is provided in the third column which is the number of slot per Bluetooth interval ($T_{eSCO}$) multiplied by the Bluetooth periodicity number (n) multiplied by the time of each slot ($t_{BTslot}$). For instance, for a Bluetooth interval of $T_{eSCO}$=6 time slots, and a repeating pattern of 8 packets, at 0.625 ms per time slot, the duration of the repeating pattern is 8*6*0.625 ms=30 ms. This is equivalent to the duration of three 10 ms LTE frames, providing an LTE frame periodicity of m=3. Each of the durations of the repeating patterns is equivalent to a whole number of LTE frames.

As shown in the second column of FIG. 3b, the repeating pattern for the Bluetooth intervals occurs every 1, 2, 4 or 8 packets (n). The third column shows that each of these patterns is a multiple of the number 8 (which is the minimum common multiple for the different $T_{eSCO}$ intervals). Thus, if at least eight packets are taken into account each time, it assures that the pattern will repeat. This is found to be true fir all $W_{eSCO}$ {0, 2, 4}. If traffic allocation for the 3GPP LTE radio and the Bluetooth radio is persistent over time, the same traffic pattern should be repeated every 8 Bluetooth packets (i.e. every 8 Bluetooth $T_{eSCO}$ intervals). If $T_{eSCO}$ is different from 6, 8, 10, 12, 14, 16, or 18, the periodicity may not be exactly 8 Bluetooth packets, for the current Bluetooth standard, with $T_{eSCO}$=6, 8, 10, 12, 14, 16, or 18, the periodicity is always 8 Bluetooth packets. If $W_{eSCO}$ is different from (0, 2, 4), the Tx/Rx repeat pattern will change.

FIG. 4a provides a table showing the repeating Tx/Rx pattern for each LTE TDD frame configuration and for each Bluetooth packet duration for $W_{eSCO}$=4. As previously discussed, each number represents the transmit slot in a Bluetooth eSCO packet at which the Bluetooth radio is able to transmit and receive without interference from the 3GPP LTE radio when the radios are synchronized, as previously discussed. The value "x" is used to show a packet where no Bluetooth transmission and reception is possible without interference with the 3GPP LTE radio when all three mechanisms M_1, M_2, and M_3 are applied. If there is enough isolation between Bluetooth and 3GPP LTE radios, only the first two mechanisms may need to be applied to avoid interference. Accordingly, FIG. 4b provides a similar table where only mechanisms M_1 and M_2 are applied.

The following algorithm can be used to predict Bluetooth packet behavior to avoid interference with the 3GPP LTE radio transmission and reception and to improve the overall performance of the collocated radios. Avoiding interference can also save power since Bluetooth radio transmission is delayed or ceased if there is a possibility of collision with transmission or reception of data from the 3GPP LTE radio, rather than wasting energy performing transmissions that will likely be lost due to the interference. The Bluetooth packet prediction algorithm is:

$$x[n] = \sum_{k=0}^{\infty}\sum_{i=0}^{7} A_i \delta(n-i-kT) \text{ with } T = 8$$

$$A_i BT \text{ packet behavior} \Rightarrow \begin{cases} A_i - 1 \Rightarrow BT \text{ packet loss} \\ A_i \geq 1 \Rightarrow BT \text{ slot number to send packet} \end{cases}$$

Where δ is a Dirac delta function, T is the number of coefficients in the repeating Tx/Rx pattern, and the coefficients $A_i$ of the algorithm represent the behavior of each Bluetooth packet. The values of $A_i$ can be obtained using a lookup table that includes the information of FIGS. 4a and/or 4b of the slot number (in $T_{eSCO}$) that comprises the repeating Tx/Rx pattern of the Bluetooth radio relative to the 3GPP LTE radio. The repeating Tx/Rx pattern can be transformed for use in the above equation based on the information in the table below.

| | Slot Number (in $T_{eSCO}$) | | | | |
|---|---|---|---|---|---|
| | 0 | 2 | 4 | 6 | ... |
| Coefficient Value ($A_i$) | 1 | 3 | 5 | 7 | ... |

More fully, the even transmit slot numbers in Table 4 can be transformed to odd numbers, with the value "0" transformed to "1". The value of x, showing that the Bluetooth radio is not able to transmit and receive, can be transformed to "-1". For example, for $T_{eSCO}$=6 and LTE frame Config 0, the repeating pattern is (0, 2, 4, x, 0, 2, 4, x), as shown in Table 4a. This translates to an $A_i$ Vector of (1, 3, 5, -1, 1, 3, 5, -1). Using the equation above, this repeating pattern for $A_i$ translates to:

$$x[n] = \sum_{k=0}^{\infty}\sum_{i=0}^{7} A_i \delta(n-i-kT) \text{ with } T = 8$$

$$x[n] = \sum_{k=0}^{\infty}[1 \cdot \delta(n-0-k \cdot 8) + 3 \cdot \delta(n-1-k \cdot 8) +$$

$$5 \cdot \delta(n-2-k \cdot 8) - 1 \cdot \delta(n-3-k \cdot 8) + 1 \cdot \delta(n-4-k \cdot 8) +$$

$$3 \cdot \delta(n-5-k \cdot 8) + 5 \cdot \delta(n-6-k \cdot 8) - 1 \cdot \delta(n-7-k \cdot 8)]$$

$$x[n] = 1 \cdot \delta(n) + 3 \cdot \delta(n-1) + 5 \cdot \delta(n-2) - 1 \cdot \delta(n-3) + +1 \cdot \delta(n-4) +$$

$$3 \cdot \delta(n-5) + 5 \cdot \delta(n-6) - 1 \cdot \delta(n-7) + +1 \cdot \delta(n-8) +$$

$$3 \cdot \delta(n-9) + 5 \cdot \delta(n-10) - 1 \cdot \delta(n-11) + +1 \cdot \delta(n-12) +$$

$$3 \cdot \delta(n-13) + 5 \cdot \delta(n-14) - 1 \cdot \delta(n-15) + \sum_{k=2}^{\infty}\sum_{i=0}^{7} A_i \delta(n-i-kT)$$

Continuing the above series, it can be determined that for a value of n=3, x[n=3]=-1, or a value of n=9, x[n=9]=3. The above equation can be used to calculate the value at each sample time "n".

Figure 5:
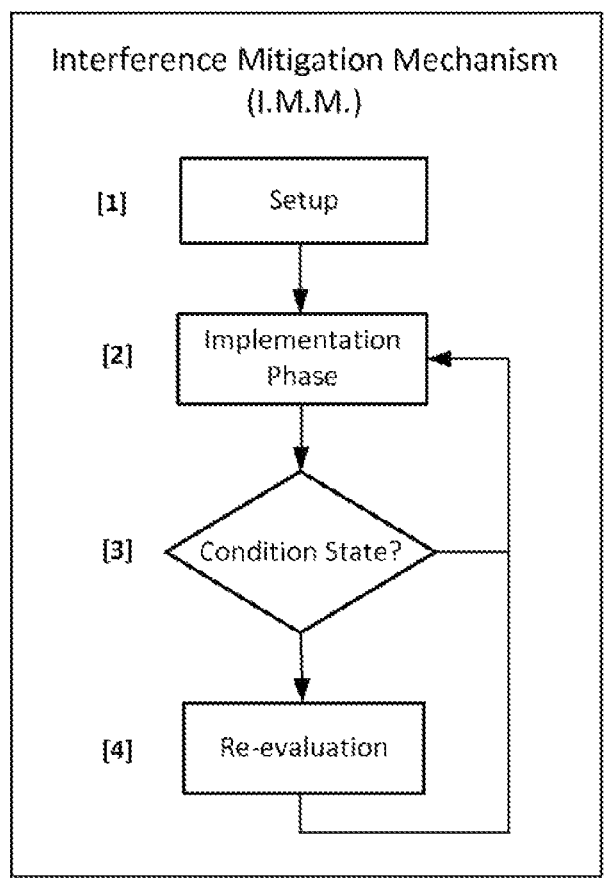
FIG. 5 is a flow chart depicting an Interference Mitigation Mechanism (IMM) in accordance with an example.

FIG. 5 provides a flow chart depicting a general diagram that synthesizes the main steps of an Interference Mitigation Mechanism. Step (1) involves initialization and setup. Step (2) is an implementation phase that involves operation based on the proposed coexistence mechanism. Step (3) involves checking a condition state to return to the implementation phase of step (2) or to pass to a re-evaluation section of step (4). In step (4), the values of the coefficients ($A_i$) are re-evaluated based on log information. After the re-evaluation, a return is made to step (2).

Figure 6:
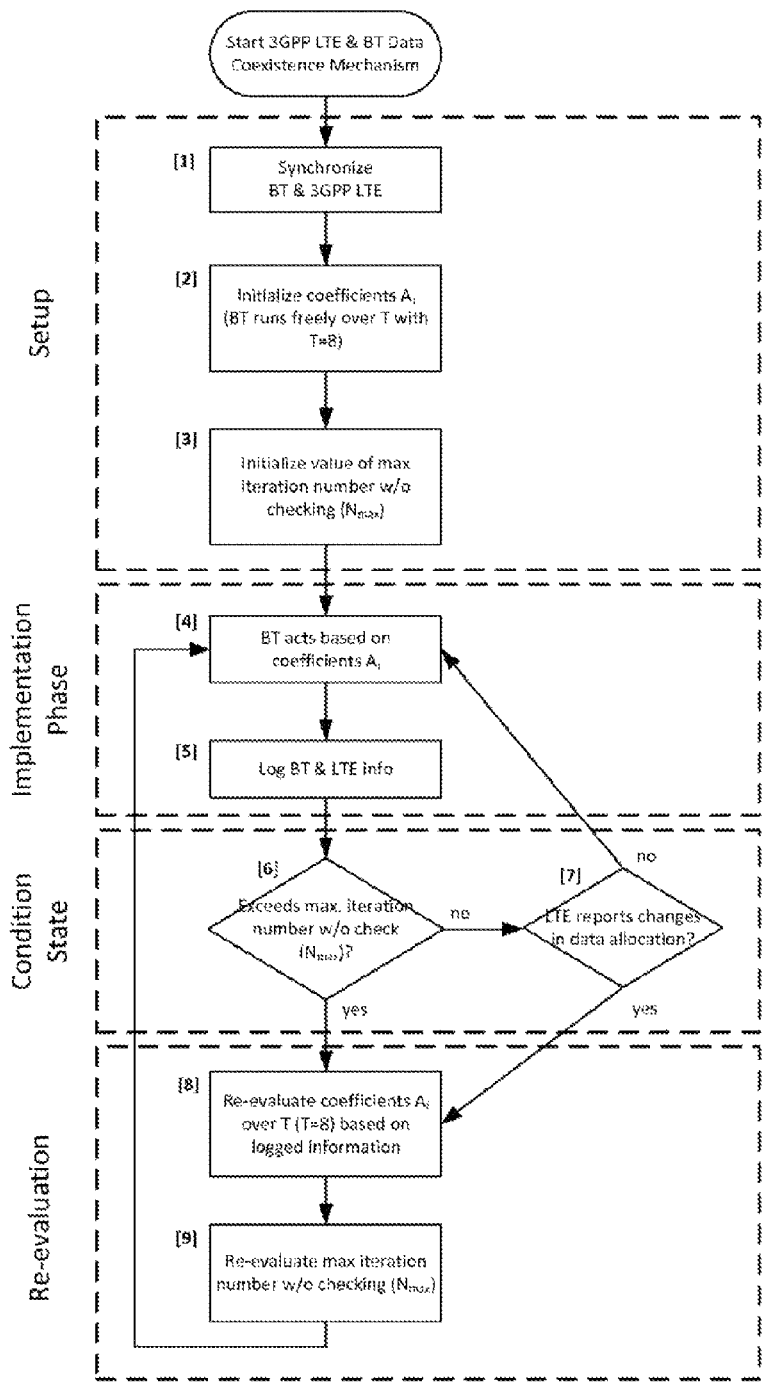
FIG. 6 is a more detailed flow chart of the IMM of FIG. 5 in accordance with an example.

FIG. 6 provides a more detailed procedure of the summary illustrated in FIG. 5. The flow diagram of FIG. 6 describes how to apply the interference mitigation mechanism based on the previously described equation to improve coexistence between the 3GPP LTE and Bluetooth radios.

Setup Section

In Step (1) the Bluetooth radio is synchronized with the 4G radio in the time domain. In the synchronization, the transition from the first transmit slot to the first receive slot in the Bluetooth radio is aligned with a switch from an uplink to downlink (Tx to Rx) in a frame of the 3GPP LTE radio. If there are several uplink to downlink switches in the 3GPP LTE frame then the transition from the Tx slot to the Rx slot in the Bluetooth radio can be aligned with the Tx to Rx switch in the 3GPP LTE radio that has the longest continuous downlink (Rx) section in dine, as shown in FIG. 1.

In Step (2), after the Bluetooth radio and the 3GPP LTE radio are synchronized, which may take several Bluetooth intervals, the coefficients ($A_i$) are initialized based on current Bluetooth behavior. To initialize the $A_i$ coefficients, the Bluetooth radio can work freely for a time duration "T", where T is the number of coefficients in the repeating Tx/Rx pattern.

In Step (3), a maximum iteration number to run without updating the coefficients ($N_{max}$) is set. The value of $N_{max}$ is set to ensure that the prediction of Bluetooth packet behavior is checked periodically to verify that the coefficients ($A_i$) predict the correct Bluetooth behavior. The value of $N_{max}$ can be set to a multiple of T, such as a multiple of T=8 in this example.

Implementation Phase

In step (4). Bluetooth packets act based on the value determined by the equation. For example, for the $10^{th}$ sample value (n=9), which correlates with the $10^{th}$ Bluetooth packet (because the equation starts with n=0), the equation predicts that x[n=9]=3, which correlates with $A_2$=3, thereby predicting that the Bluetooth radio will be free of interference in the $10^{th}$ packet if it transmits at slot number 2 and receives at slot number 3, namely without interference from/to the 3GPP LTE radio. For the fourth sample (n=3), the equation predicts that x[n=3]=−1, thereby predicting that the Bluetooth radio will not have a consecutive transmit and receive time slot that will be interference free from the 3GPP LTE radio in the fourth radio packet for the $T_{eSCO}$ value used by the Bluetooth radio. Accordingly, a request can be sent to the 3GPP LTE radio to reserve a period to allow the Bluetooth radio to transmit in the fourth radio packet. This will be discussed more fully below.

In step (5) the Bluetooth radio and the 3GPP LTE radio can log various kinds of information regarding the performance of their transmission and reception of data. For instance, each radio can log a start and stop time of the transmit and receive periods, the transmit and receive power, the number of packets that are lost, and so forth. This information can be used by the interference mitigation mechanism to re-evaluate the values of the $A_i$ coefficients, which will be discussed more fully with respect to step (8).

Condition State Section

In step (6), a determination can be made as to whether a maximum number of iterations ($N_{Max}$) is reached. If not, in Step (7) a determination can be made regarding whether the 3GPP LTE radio has reported a change in data allocation. As previously discussed, the 3GPP LTE radio transmits frames are made up of 10 subframes that are each 1 ms in length. The 3GPP LTE radio can be allocated to receive or transmit in any of those subframes. When the subframe allocation is changed (by an eNB or other network device), then the 3GPP LTE radio may receive data at a different moment in time. This causes the interference between the Bluetooth radio and the 3GPP LTE radio to be different and the pattern of interference may change. When this occurs, the process can continue to step (8). If the data allocation has not changed, then the process can revert to step (4).

Re-Evaluation Section

In step (8), the coefficients ($A_i$) can be re-evaluated based on the logged information collected in step (5). For example, a determination can be made as to whether the Bluetooth radio transmit time slots suggested by the $A_i$ coefficients started and stopped at the proper time, and whether the $A_i$ coefficients were effective in transmitting and receiving data without substantial interference from the 3GPP LTE radio. The re-evaluation will be more fully discussed with respect to FIG. 8.

In step 9, the maximum number of iterations ($N_{max}$) can be increased or decreased based on the system needs. The modification of $N_{max}$ can be accomplished in an intelligent way, wherein the number is adjusted based on current and previous logged data. For example, if the number of packet losses of the Bluetooth radio is above a selected threshold, the value of $N_{max}$ can be reduced to allow the coefficient values of $A_i$ to be re-evaluated more often, if the number of packet losses is significantly less than the threshold, the $N_{max}$ value may be increased to reduce processing. The actual value of $N_{max}$ may depend on the system design and the environment in which the mobile device is operating in. Thus, the ability to change the $N_{max}$ value allows the mobile device to meet a Quality of Service (QoS) requirement operating in different types of environments.

Figure 7:
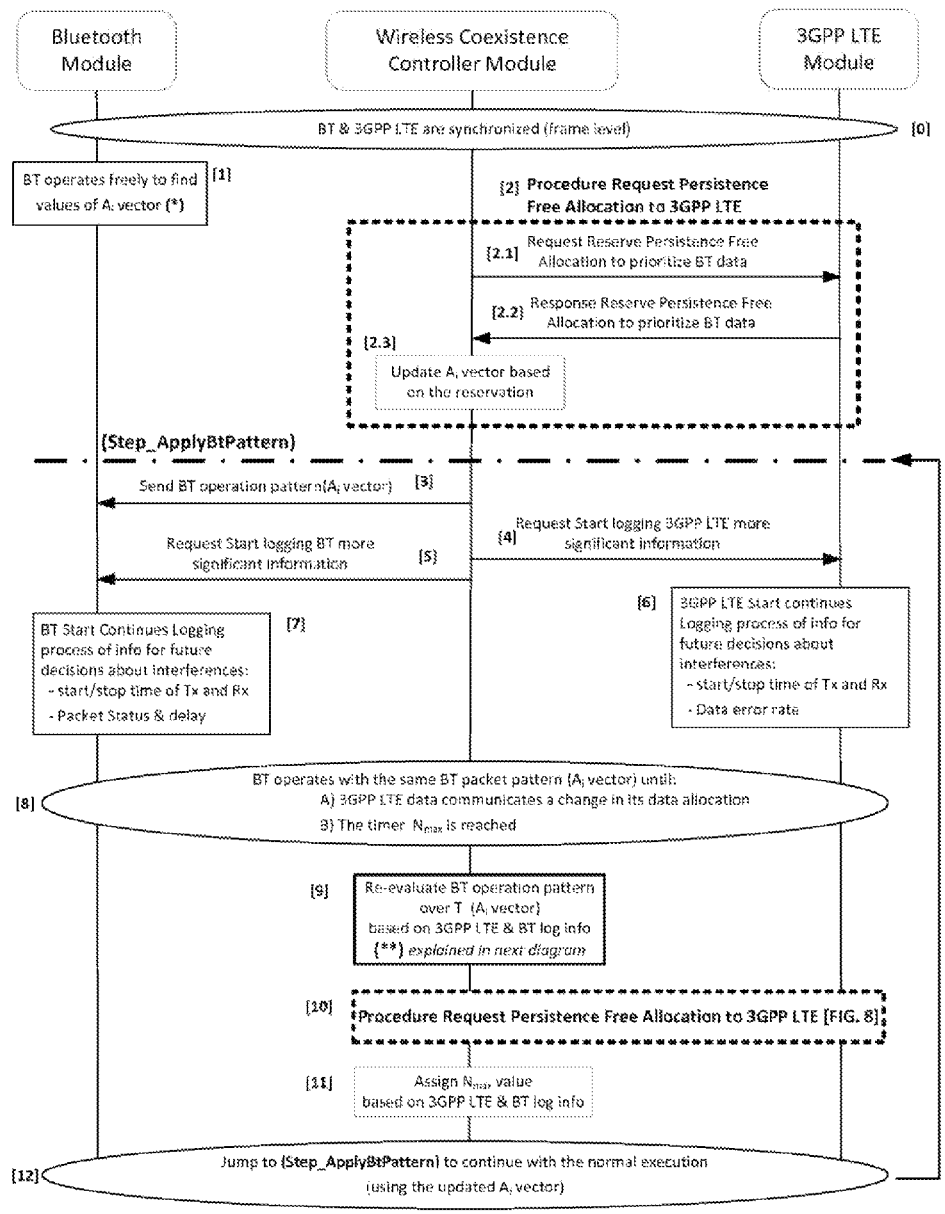
FIG. 7 is a flow chart depicting a sequence of actions to apply a prediction algorithm in accordance with an example.

FIG. 7 depicts one example of a sequence of actions to apply the prediction algorithm for a Bluetooth radio transmitting eSCO packets to delay or cease its transmission based on the equation that characterizes the Bluetooth packet behavior and operation. This figure uses an example of a Wireless Coexistence Controller Modulo but its functionality may be implemented between the wireless modules (in particular for this example, the Bluetooth and 3GPP LTE modules).

In step (0), the Bluetooth and 3GPP LTE radios are synchronized, as previously discussed. In step (1), the values of the coefficients ($A_i$) are updated based on current Bluetooth behavior that runs freely during at least T times of $T_{eSCO}$. The value of T can be set equal to 8 for each type of $T_{eSCO}$ for $W_{eSCO}$ {0, 2, 4} and for the each type of 3GPP LTE TDD frame configuration. For other Bluetooth connections or packet types, the Tx/Rx pattern may repeat at other intervals and T may have a different value.

In step (2), for those $T_{eSCO}$ intervals that Bluetooth loses its packets (i.e. when the $A_i$ value is equal to −1), the 3GPP LTE radio can be requested to reserve time without allocating data. This is called Persistence Free Allocation. In step (2.1) a request is made from the wireless coexistence controller module to the 3GPP LTE module to provide a persistence free allocation to prioritize Bluetooth data transmission. In step (2.2), the 3GPP LTE module responds with a specific time slot that can be used by the Bluetooth radio in the packet associated with the $A_i$=−1 value. The $A_i$ vector can then be updated based on this information. For example, $A_i$ may equal (1, 3, 5, −1, 1, 3, 5, −1). For the fourth and eighth packets, the 3GPP LTE radio may send a response to the persistence free allocation request that the Bluetooth radio can use slot 2 to transmit and slot 3 to receive data. The $A_i$ value for slot 2 is equal to 3. Therefore, the $A_i$ vector can be updated to (1, 3, 5, 3, 1, 3, 5, 3).

In step (3), the Bluetooth radio can send packets according to the algorithm previously defined using the operation pattern that is defined by the $A_i$ vector. In steps (4) and (5), a request to start logging information can be sent to the Bluetooth and 3GPP LTE radios, respectively. In step (6), the 3GPP LTE radio can continue to log data that can be used to make future decisions regarding interference. As previously discussed, the data that is logged can include the start and stop times for Tx and Rx subframes and the data error rate for data transmitted by the 3GPP LTE radio. Similarly, in step (7), the Bluetooth radio can continue to log information on which future decisions regarding interference can be based. The information that is logged can include start/stop times for transmit and receive slots, as well as packet status (i.e. transmission success or failure) and delay information.

In step (8), the Bluetooth radio can operate with the same Tx/Rx packet pattern based on the $A_i$ vector until either: (a) the 3GPP LTE module communicates a change in data allocation; or (b) the number of iterations based on $N_{max}$ has been reached, as previously discussed.

In step (9), the coefficients ($A_i$) are re-evaluated based on the information that was logged for the Bluetooth radio and the 3GPP LTE radio. This procedure is more fully described with respect to FIG. 8. In step (10), a persistence free allocation request is made to the 3GPP LTE, radio based on the updated $A_i$ vector coefficients, as discussed in step (2). In step (11), the maximum number of iterations of $N_{max}$ is updated by the wireless coexistence controller module based on current and previous learning of the number of transmission and packet errors, as previously discussed. The value of $N_{max}$ may be decreased proportionally to a desired decrease in the number of transmission errors. Similarly, the value of $N_{max}$ may be increased proportionally to a desired increase in the number of transmission errors if the number is very low and there is a need to conserve on processing time or processor power. The process can then be repeated using the updated $A_i$ vector for the number of iterations set by $N_{max}$ by returning to step (3). Once the value of $N_{max}$ has been reached then step (2) can be performed to obtain an updated value of the $A_i$ vector.

Figure 8:
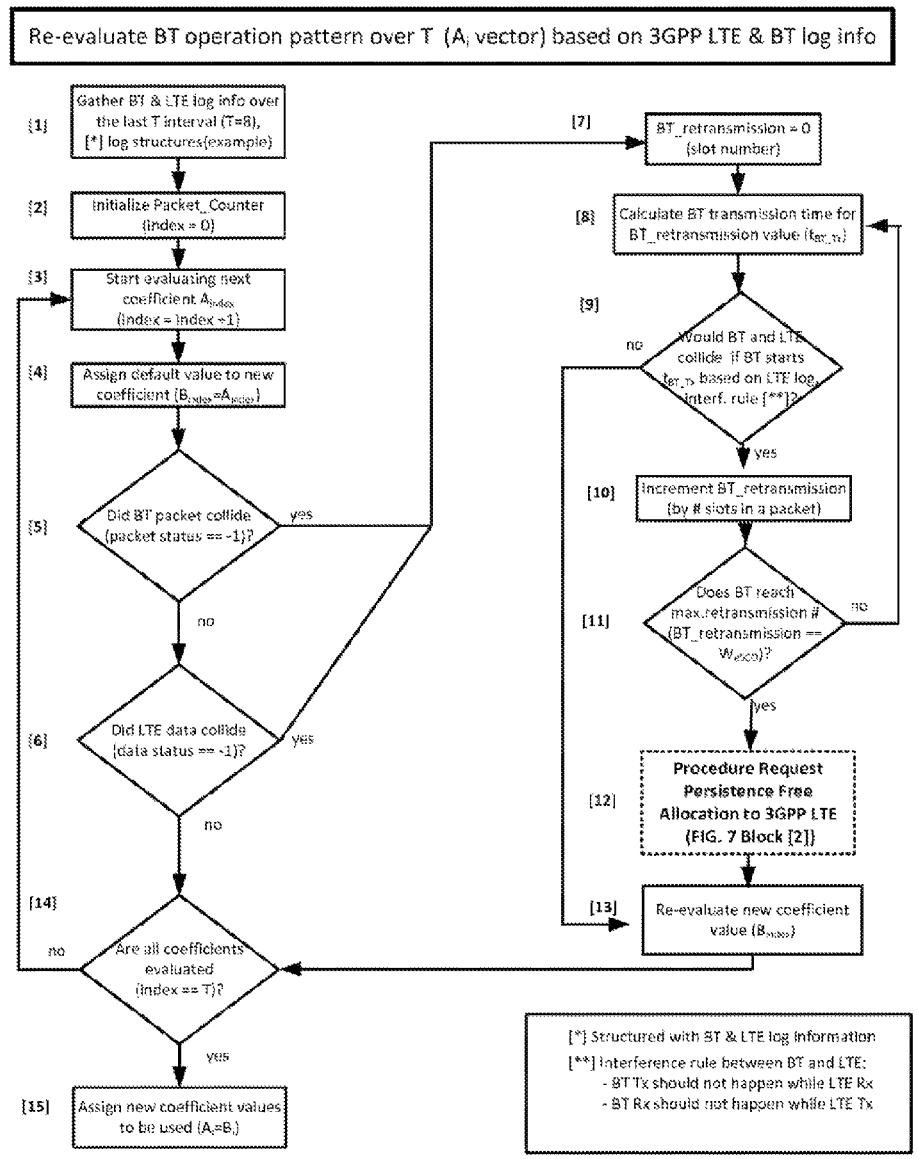
FIG. 8 is a flow chart depicting additional details to the flow chart of FIG. 7 in accordance with an example.

FIG. 8 illustrates one example procedure that can be used to re-evaluate the Bluetooth Tx/Rx packet pattern ($A_i$ vector) based on the information logged by the Bluetooth radio and the 3GPP LTE radio.

In Step (1), information is gathered and logged by the Bluetooth radio and the 3GPP LTE radio for the last T=8 intervals of time, wherein an interval is equal to $T_{eSCO}$. In step (2), a packet counter in the wireless coexistence controller module is initialized to track each $T_{eSCO}$ interval of the coefficient $A_i$ that is already evaluated. The counter is then incremented in step (3) to evaluate the next coefficient (i.e. $A_0$, $A_1$, ... $A_7$). In step 4, the current coefficient value is assigned as the new value in the case there is no data (packets) that are lost, thereby making the same value valid. In step (5), a check is made to determine if the Bluetooth packet collided with a transmission from the 3GPP LTE radio. If a collision has occurred, then the flow continues to step (7). Otherwise, the flow progresses to step (6), where a determination is made if data in the 3GPP LTE radio collided with the Bluetooth packet.

In steps 7-13 of FIG. 8, a determination is made if a different slot in a Bluetooth packet (having a $T_{eSCO}$ interval) can be used to transmit data without a collision occurring with the 3GPP LTE data. First, in step (7), the Bluetooth retransmission is initialized to keep track of each attempt. In step (8), based on the Bluetooth log information, a start time for a Bluetooth packet is calculated ($t_{BT\_Tx}$). In step (9), a check is made to determine if the Bluetooth packet (starting at $t_{BT\_Tx}$) would collide based on 3GPP LTE log information and the interference rules (M_1, M_2, and/or M_3) between the 3GPP LTE and Bluetooth transmissions.

If it is determined that the Bluetooth packet would collide at the first transmission location (i.e. slot 0) then in step (10) the next retransmission period is incremented (slot 2). Otherwise, if no collision is deemed to occur, then the process continues to step (13). In step (11), a determination is made whether the maximum number of retransmission attempts have occurred, based on the $W_{eSCO}$ value. As previously discussed, $W_{eSCO}$ can currently have values of 0, 2, or 4. However, it is possible for additional retransmission attempts to occur in larger values of $T_{eSCO}$, such as $T_{eSCO} > 6$. If there are more retransmission possibilities, then the process returns to step (8). Otherwise, the process continues to step (12), where a request time is sent to the 3GPP LTE radio to reserve a time to provide priority to the Bluetooth packet, as discussed in step (2) of FIG. 7. Once a new opportunity (in terms of time slot) to transmit a Bluetooth packet has been obtained from the 3GPP LTE radio, the coefficient value for $A_i$ is updated in step (13). In step (14), it is determined if all coefficients of $A_i$ have been evaluated. If more coefficients of $A_i$ need to be evaluated, the process moves to step (3). Otherwise, the process proceeds to step (15) and assigns the new coefficient values to the $A_i$ vector. These coefficient values can then be used by the Bluetooth radio to transmit and receive data with minimal interference with the 3GPP LTE radio.

FIG. 9a illustrates one example of data logged for a Bluetooth radio configured to communicate using eSCO packets. The $A_i$ values are stored in the logged data that predicts at which transmit slot the data can be sent in each eSCO packet. The start time for each packet is recorded and the status of each packet (i.e. whether a collision occurred) is also recorded. If a collision does occur, the $A_i$ value can be adjusted to a different transmit slot (and consecutive receive slot) in the packet where interference does not occur, as previously discussed. If a transmit/receive slot pair cannot be found in the packet then the request to reserve a priority time can be sent to the LTE radio.

FIG. 9b illustrates one example of data logged for a 3GPP LTE radio. The data is logged for at least the length of time associated with the number of Bluetooth packets in the Tx/Rx repeating pattern, which is typically T=8 for a selected eSCO format. In this example, the data is logged in blocks. The blocks may represent a group of sub-frames of the OFDMA data structure. For each block, the start time, stop time, data direction (Tx or Rx), and data status (collision (−1) or no collision (1)) is logged. This information can then be used to check the selected $A_i$ values were correct and to reserve the priority time in the LTE radio for the Bluetooth radio to transmit, when necessary.

Figure 10:
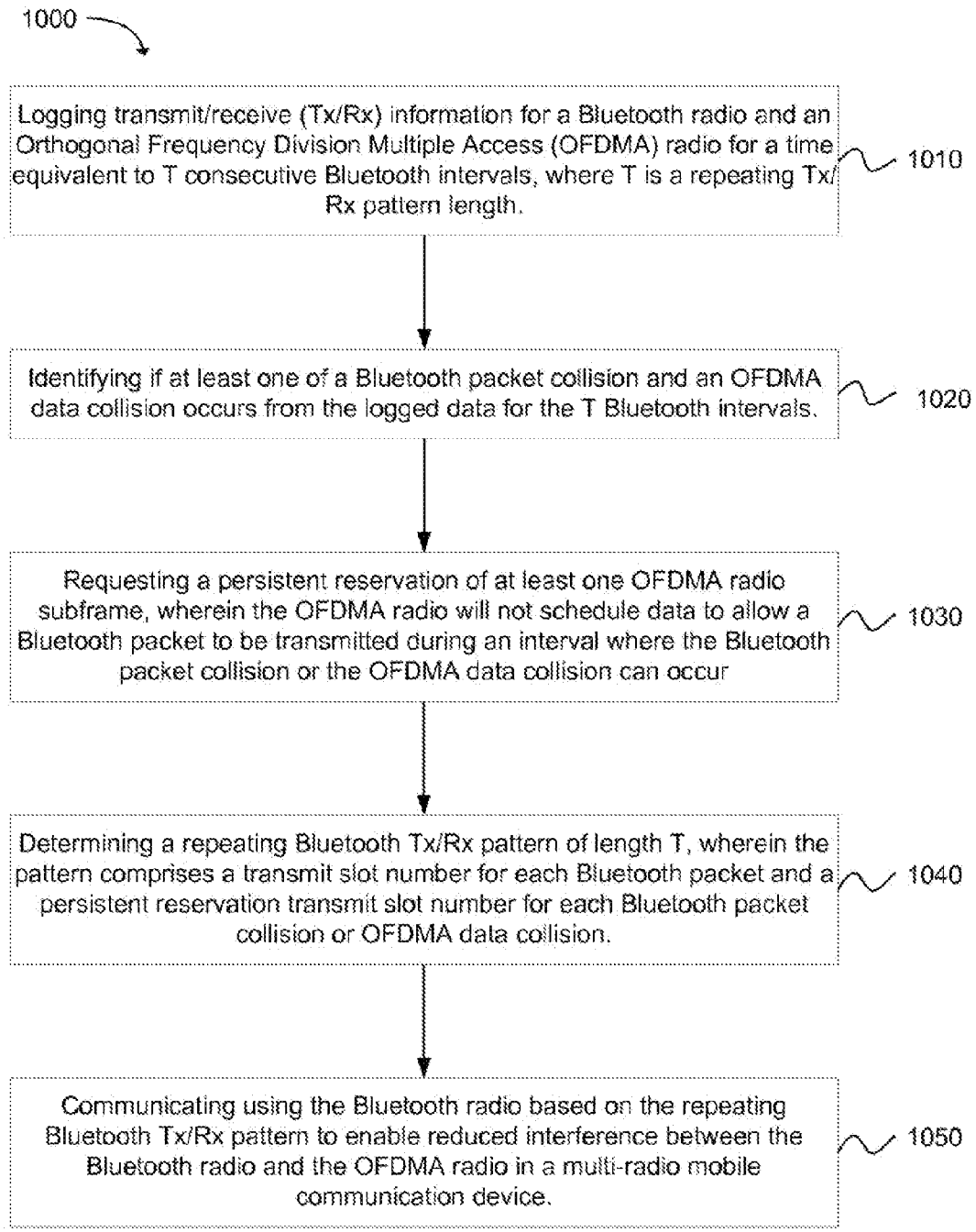
FIG. 10 depicts a flow chart of a method for reducing interference in collocated radios in accordance with an embodiment of the present invention.

In another embodiment, a method 1000 for reducing interference in collocated radios is disclosed, as depicted in the flow chart of FIG. 10. The method includes the operation of logging 1010 transmit/receive (Tx/Rx) information for a Bluetooth radio and an Orthogonal Frequency Division Multiple Access (OFDMA) radio for a time equivalent to T consecutive Bluetooth intervals, where T is a repeating Tx/Rx pattern length. The method further comprises identifying 1020 if at least one of a Bluetooth packet collision and an OFDMA data collision occurs from the logged data for the T Bluetooth intervals. A persistent reservation is requested 103) of at least one OFDMA subframe. When a persistent reservation is requested, the OFDMA radio will not schedule data to allow a Bluetooth packet to be transmitted during an interval where the Bluetooth packet collision or the OFDMA data collision can occur.

The method 1000 further comprises determining 1040 a repeating Bluetooth Tx/Rx pattern of length T. The Tx/Rx pattern comprises a transmit slot number for each Bluetooth packet and a persistent reservation transmit slot number for each Bluetooth packet collision or OFDMA data collision. The persistent reservation transmit slot can be determined by requesting the OFDMA radio to reserve an interval where the Bluetooth packet collision or the OFDMA data collision can occur. The Bluetooth radio can then communicate 1050 based on the repeating Bluetooth Tx/Rx pattern to enable reduced interference between the Bluetooth radio and the OFDMA radio in the multi-radio mobile communication device.

Figure 11:
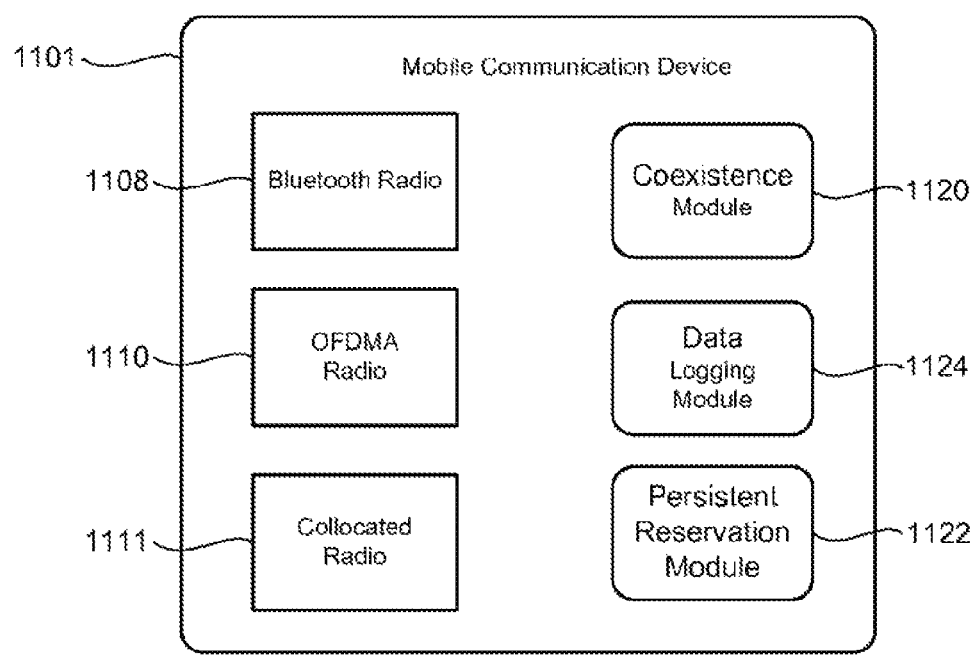
FIG. 11 illustrates a block diagram of a radio coexistence system in accordance with an example.

In another embodiment, a radio coexistence system is disclosed. FIG. 11 illustrates an example block diagram of the system. The system comprises a wireless coexistence controller module 1120 in a mobile communication device 1101 that is operable to communicate with a Bluetooth radio 1108 configured to communicate a packet over a selected interval and an Orthogonal Frequency Division Multiple Access (OFDMA) radio 1110 configured to communicate using Time Division Duplexing (TDD). A data logging module 1124 is configured to log transmit/receive (Tx/Rx) information for the Bluetooth radio and the OFDMA radio for a time equivalent to T Bluetooth intervals, where T is a repeating Bluetooth Tx/Rx pattern length. As previously discussed, T can be set to eight when the OFDMA radio operates based on the 3GPP LTE specification and the Bluetooth radio operates using eSCO connection with one slot formatted packets. Other types of OFDMA radios can also be collocated 1111.

A persistent reservation module 1122 can be configured to request a persistent reservation of at least one OFDMA radio subframe. When this time is reserved, the OFDMA radio 1108 will not schedule data at the interval when the logged data indicates at least one of a Bluetooth packet collision and an OFDMA data collision occurred, thereby allowing a Bluetooth packet to be transmitted in that interval (i.e. transmit and receive slot are sent/received successfully). This interval can be reserved persistently, meaning that the reservation repeats every T Bluetooth packets. The reservation may be changed or updated based on communication changes that occur within or to the mobile communication device, as previously discussed. The wireless coexistence controller module 1120 is configured to modify the repeated Bluetooth Tx/Rx pattern based on the persistent reservation and operate the Bluetooth radio based on the modified repeated Bluetooth Tx/Rx pattern.

Figure 12:
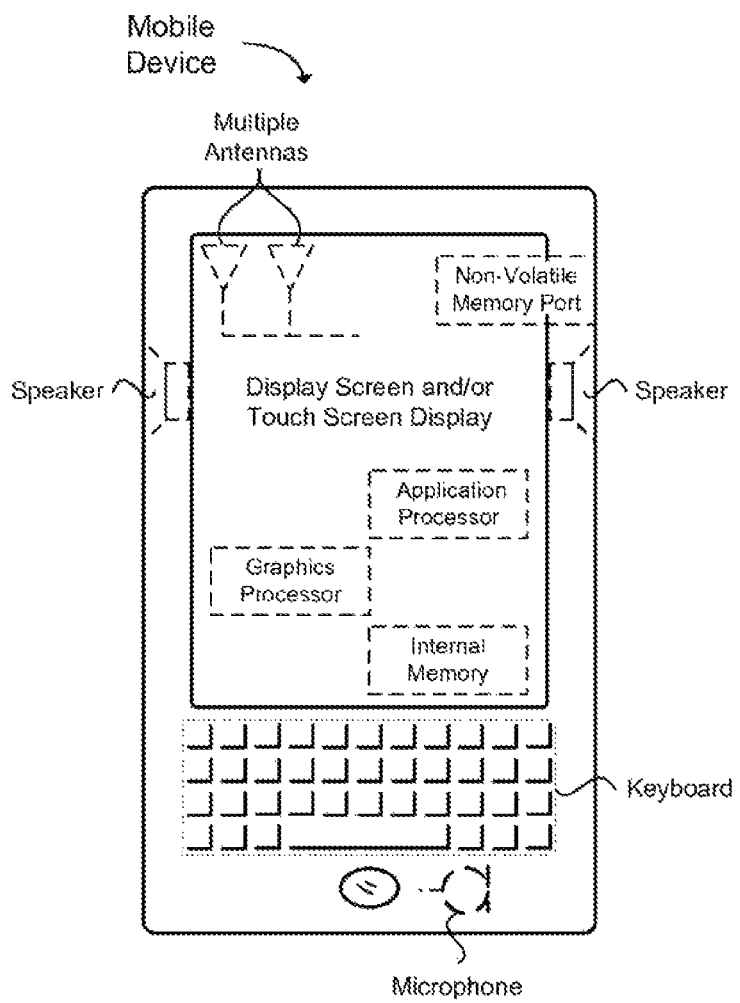
FIG. 12 illustrates a mobile wireless device in accordance with an example.

FIG. 12 provides an example illustration of a mobile communication device, such as a user equipment (UE), a mobile station (MS), a mobile wireless device, a tablet, a handset, or another type of mobile wireless device. The mobile device can include one or more antennas configured to communicate with a base station (BS), an evolved Node B (eNB), or other type of wireless wide area network (WWAN) access point. The mobile device can be configured to communicate using at least one wireless communication standard including 3GPP LTE. Worldwide Interoperability for Microwave Access (WiMAX), High Speed Packet Access (HSPA). Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 12 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives fir the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without, one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for reducing interference in collocated radios of a multi-radio mobile communication device, comprising:
    logging transmit/receive (Tx/Rx) information for a Bluetooth radio and an Orthogonal Frequency Division Multiple Access (OFDMA) radio for a time equivalent to T consecutive Bluetooth intervals, where T is a repeating Tx/Rx pattern length;
    identifying if at least one of a Bluetooth packet collision and an OFDMA data collision occur from the logged data for the T Bluetooth intervals;
    requesting a persistent reservation of at least one OFDMA radio subframe, wherein the OFDMA radio will not schedule data to allow a Bluetooth packet to be transmitted during an interval where the Bluetooth packet collision or the OFDMA data collision can occur;
    determining a repeating Bluetooth Tx/Rx pattern of length T, wherein the pattern comprises a transmit slot number for each Bluetooth packet and a persistent reservation transmit slot number for each Bluetooth packet collision or OFDMA data collision; and
    communicating using the Bluetooth radio based on the repeating Bluetooth Tx/Rx pattern to enable reduced interference between the Bluetooth radio and the OFDMA radio in a multi-radio mobile communication device.

2. The method of claim 1, wherein the Tx/Rx pattern is comprised of $A_i$ coefficients, wherein i is an integer number that represents an interval number within T possible intervals, and the $A_i$ coefficients are used to determine a behavior of the Bluetooth radio in each moment of time using the algorithm:

$$x[n] = \sum_{k=0}^{\infty} \sum_{i=0}^{7} A_i \delta(n - i - kT) \text{ with } T = 8$$

$$A_i \rightarrow BT \text{ packet behavior} \Rightarrow \begin{cases} A_i = -1 \Rightarrow BT \text{ packet loss} \\ A_i \geq 1 \Rightarrow BT \text{ slot number to send packet} \end{cases},$$

where δ is a Dirac delta function and n is a sample time.

3. The method of claim 1, wherein the OFDMA radio is configured to communicate using Time Division Duplexing (TDD) and is one of a Third Generation Partnership Project Long Term Evolution (3GPP LTE) radio and a Worldwide Interoperability for Microwave Access (WiMAX) radio.

4. The method of claim 1, wherein logging the Tx/Rx information further comprises:
    logging a start time and a stop time, a packet collision status, and a delay time for of each Bluetooth interval; and
    logging a start time, a stop time, and a data error rate for each OFDMA sub-frame.

5. The method of claim 1, further comprising logging the (Tx/Rx) information for the Bluetooth radio and the OFDMA radio for T consecutive intervals, wherein each interval is an extended Synchronous Connection Oriented (eSCO) packet and T=8.

6. The method of claim 1, wherein requesting the persistent reservation further comprises determining if a retransmission of data in the Bluetooth packet can occur at other transmission slots in the Bluetooth interval without a collision occurring for a predetermined number of retransmission attempts.

7. The method of claim 6, further comprising incrementing the transmission slot number by two slots and determining if the incremented transmission slot collides with the OFDMA radio for the predetermined number of retransmission attempts.

8. The method of claim 1, wherein requesting the persistent reservation further comprises identifying the at least one subframe from the OFDMA radio that synchronizes with the persistent reservation transmit slot in the Bluetooth packet, wherein no transmission from the at least one subframe will occur during the persistent reservation transmission slot in the Bluetooth packet.

9. The method of claim 1, wherein the Bluetooth radio continues to communicate using the repeating Bluetooth Tx/Rx pattern until the OFDMA radio changes a data allocation.

10. The method of claim 1, further comprising identifying an updated repeating Bluetooth Tx/Rx pattern after a transmission timer value is reached.

11. The method of claim 10, further comprising increasing the transmission timer value when a number of packet collisions is greater than a selected threshold.

12. The method of claim 10, further comprising decreasing the transmission timer value when a number of packet collisions is less than a selected threshold.

13. A computer program product, comprising a non-transitory computer readable storage medium having a computer readable program code embodied therein, the computer readable program code adapted to be executed to implement the method of claim 1.

14. A radio coexistence system, comprising:
    a wireless coexistence controller module in a mobile communication device that is operable to communicate with a Bluetooth radio configured to communicate a packet over a selected interval and an Orthogonal Frequency Division Multiple Access (OFDMA) radio configured to communicate using Time Division Duplexing (TDD), wherein the wireless coexistence controller module is comprised of code that is located in one or more digital memory devices to be executed by one or more processors or the wireless coexistence controller module is implemented in one or more hardware circuits;
    a data logging module configured to log transmit/receive (Tx/Rx) information for the Bluetooth radio and the OFDMA radio for a time equivalent to T Bluetooth intervals, where T is a repeating Bluetooth Tx/Rx pattern length, wherein the data logging module is comprised of code that is located in one or more digital memory devices to be executed by one or more processors or the data logging module is implemented in one or more hardware circuits;
    a persistent reservation module configured to request a persistent reservation of at least one OFDMA radio subframe, wherein the OFDMA radio will not schedule data at the interval when the logged data indicates at least one of a Bluetooth packet collision and an OFDMA data collision occurred, to allow a Bluetooth packet to be transmitted, wherein the persistent reservation module is comprised of code that is located in one or more digital memory devices to be executed by one or more processors or the persistent reservation module is implemented in one or more hardware circuits; and wherein the wireless coexistence controller module is configured to modify the repeated Bluetooth Tx/Rx pattern based on the persistent reservation and operate the Bluetooth radio based on the modified repeated Bluetooth Tx/Rx pattern.

15. The system of claim 14, wherein the repeated Bluetooth Tx/Rx pattern has $A_i$ coefficients, where i is an integer number that represents an interval number within T possible intervals, and the $A_i$ coefficients are used to determine a behavior of the Bluetooth radio in each moment of time using the algorithm:

$$x[n] = \sum_{k=0}^{\infty} \sum_{i=0}^{7} A_i \delta(n - i - kT) \text{ with } T = 8$$

$$A_i \rightarrow BT \text{ packet behavior} \Rightarrow \begin{cases} A_i = -1 \Rightarrow BT \text{ packet loss} \\ A_i \geq 1 \Rightarrow BT \text{ slot number to send packet} \end{cases},$$

where δ is a Dirac delta function and n is a sample time.

16. The system of claim 14, wherein the OFDMA radio is one of a Third Generation Partnership Project Long Term Evolution (3GPP LTE) radio or a Worldwide Interoperability for Microwave Access (WiMAX) radio.

17. The system of claim 14, wherein the Bluetooth radio, the OFDMA radio, the wireless coexistence controller module, and the persistent reservation module are all integrated in a single wireless device.

18. The system of claim 14, wherein the wireless coexistence controller module and the persistent reservation module are integrated in at least one of the Bluetooth radio and the OFDMA radio.

19. The system of claim 14, wherein the Bluetooth radio is configured to transmit the packet over the selected interval, wherein the interval is an extended Synchronous Connection Oriented (eSCO) packet length.

20. The system of claim 14, wherein the data logging module is configured to log information including:
  a start time and a stop time, a packet collision status, and a delay time for each Bluetooth packet; and
  a start time, a stop time, and a data error rate for each OFDMA sub-frame.

21. The system of claim 20, wherein the persistent reservation module is configured to:
  determine if a Bluetooth data packet and OFDMA data will collide based on the start time and stop time of each Bluetooth packet interval and each OFDMA sub-frame; and
  increment a transmission in the Bluetooth data packet to a next transmission slot until the collision will not occur, for a predetermined number of retransmission attempts; and
  communicate the transmission slot wherein the Bluetooth data packet does not collide to the wireless coexistence controller module to modify the repeated Bluetooth Tx/Rx pattern based on the persistent reservation.

22. The system of claim 14, wherein the mobile communication device is configured to connect to at least one of a wireless local area network (WLAN), a wireless personal area network (WPAN), and a wireless wide area network (WWAN), wherein the mobile communication device includes an antenna, a touch sensitive display screen, a speaker, a microphone, a graphics processor, an application processor, internal memory, a non-volatile memory port, or combinations thereof.

23. A method for reducing interference in collocated radios, comprising:
  identifying a repeating transmit/receive (Tx/Rx) pattern for multiple radios located in a mobile communication device having a Bluetooth radio collocated with an Orthogonal Frequency Division Multiple Access (OFDMA) radio;
  logging Tx/Rx information for the Bluetooth radio and the OFDMA radio for T consecutive Bluetooth packet intervals, where T is a length of the Tx/Rx pattern;
  identifying if at least one of a Bluetooth packet collision and an OFDMA data collision occurs from the logged data for the T Bluetooth packet intervals;
  requesting a persistent reservation of at least one OFDMA subframe, wherein the OFDMA radio will not schedule data to allow a Bluetooth packet to be transmitted during the interval where the Bluetooth packet collision or the OFDMA data collision occurred;
  modifying the repeating Tx/Rx pattern based on the persistent reservation; and
  communicating using the Bluetooth radio based on the modified repeating Bluetooth Tx/Rx pattern to enable interference free communication for the Bluetooth radio and the OFDMA radio in a multi-radio mobile communication device.

24. The method of claim 23, wherein the Tx/Rx pattern is comprised of $A_i$ coefficients, wherein i=T, and the $A_i$ coefficients are used to determine a behavior of the Bluetooth radio in each moment of time using the algorithm:

$$x[n] = \sum_{k=0}^{\infty} \sum_{i=0}^{7} A_i \delta(n - i - kT) \text{ with } T = 8$$

$$A_i \rightarrow BT \text{ packet behavior} \Rightarrow \begin{cases} A_i = -1 \Rightarrow BT \text{ packet loss} \\ A_i \geq 1 \Rightarrow BT \text{ slot number to send packet} \end{cases},$$

where δ is a Dirac delta function and n is a sample time.

25. The method of claim 23, wherein the OFDMA radio is one of a Third Generation Partnership Project Long Term Evolution (3GPP LTE) radio or a Worldwide Interoperability for Microwave Access (WiMAX) radio.

26. The method of claim 23, wherein requesting the persistent reservation further comprises determining if a retransmission of data in the Bluetooth packet can occur at other transmission slots in the Bluetooth eSCO packet without a collision occurring for a predetermined number of retransmission attempts.

27. The method of claim 26, further comprising incrementing the transmission slot number by two slots and determining if the incremented transmission slot collides with the OFDMA radio for the predetermined number of retransmission attempts.

28. The method of claim 23, wherein requesting the persistent reservation further comprises identifying the at least one subframe from the OFDMA radio that synchronizes with a persistent reservation transmit slot in the Bluetooth packet, wherein no transmission from the at least one subframe will occur during the persistent reservation transmission slot in the Bluetooth packet.

29. A computer program product, comprising a non-transitory computer readable storage medium having a computer readable program code embodied therein, the computer readable program code adapted to be executed to implement the method of claim 23.

* * * * *